Figure 1:
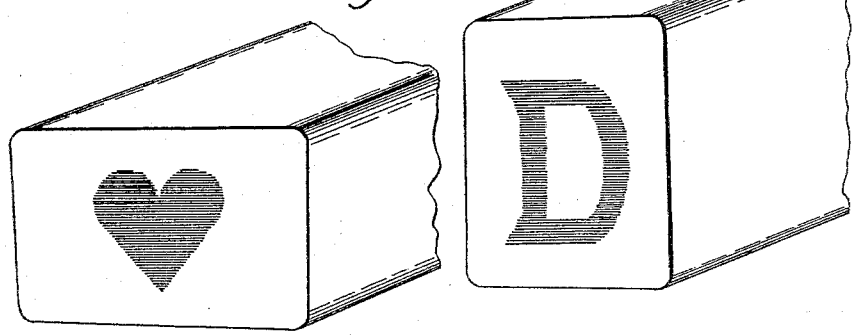

(Specimens.)

2 Sheets—Sheet 1.

W. H. HUNTER.
METHOD OF AND APPARATUS FOR FORMING DESIGNS IN COLOR IN BLOCKS OF ICE CREAM.

No. 545,294.  Patented Aug. 27, 1895.

Witnesses,
W. Rees Edelen.
Geo. M. Whitney.

Inventor.
William Henderson Hunter,
By Story B. Lord,
Attorney.

(Specimens.)
W. H. HUNTER.
METHOD OF AND APPARATUS FOR FORMING DESIGNS IN COLOR IN BLOCKS OF ICE CREAM.
No. 545,294. Patented Aug. 27, 1895.
2 Sheets—Sheet 2.
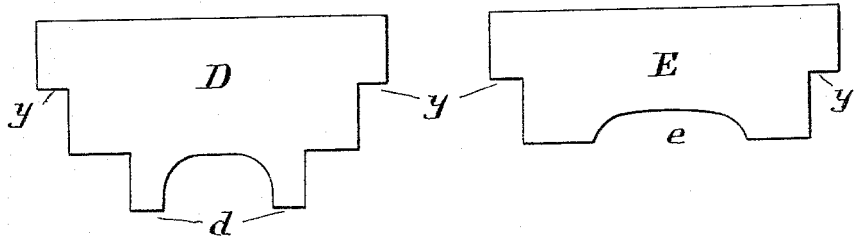
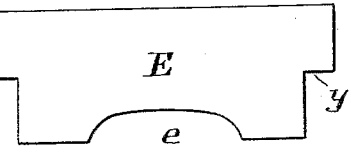
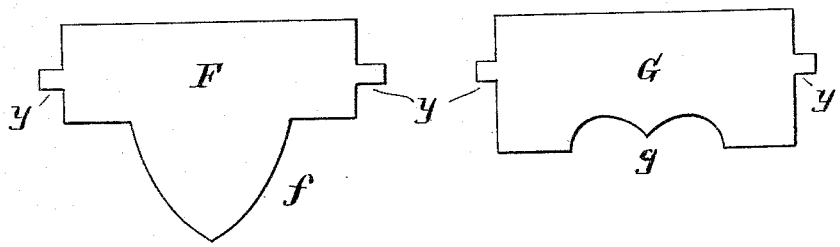
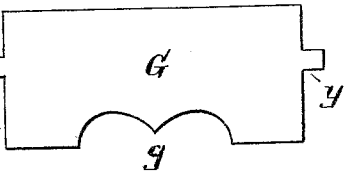
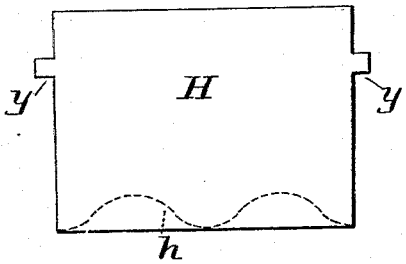
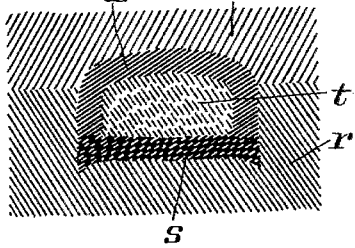
Witnesses.
H. Rees Edelen,
Geo. M. Whitney
Inventor.
William Henderson Hunter,
By Scong B. Sad.
Attorney.

UNITED STATES PATENT OFFICE.

WILLIAM H. HUNTER, OF BLOOMINGTON, ILLINOIS.

METHOD OF AND APPARATUS FOR FORMING DESIGNS IN COLOR IN BLOCKS OF ICE-CREAM.

SPECIFICATION forming part of Letters Patent No. 545,294, dated August 27, 1895.

Application filed December 11, 1894. Serial No. 531,535. (Specimens.)

*To all whom it may concern:*

Be it known that I, WILLIAM H. HUNTER, a citizen of the United States, residing at Bloomington, in the county of McLean and State of Illinois, have invented certain new and useful Improvements in Methods of and Apparatus for Forming Designs in Color in Blocks of Ice-Cream; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates more particularly to the production of pleasing color-effects in forms, blocks, or bricks of ice-cream or water-ice, or like blocks or loaves of food of a plastic character, so that as slices are successively cut from the form, brick, or loaf in serving it or in otherwise using it the design in color will appear in each slice and on the face of the brick, form, or loaf. Heretofore the methods followed in producing bricks of ice-cream of variegated color have been either, first, to separately freeze cream of different colors and then to place in a mold slices of frozen cream of the different colors, so that when the form or brick of frozen cream is sliced transversely the slices will show the colors in parallel lines, or, second, to place frozen cream of one color into a mold and stamp into it with a stamp or die a figure or design, then to add frozen cream of another color and again stamp thereon a figure or design. It has thus been attempted to produce figures or designs in a brick of ice-cream; but these methods do not produce satisfactory results, as the pliability of frozen cream is such that perfect or precise designs cannot be thus formed in the soft cream.

The object of the present invention is to enable pleasing effects, with perfect and precise lines to the figure or design, to be easily produced in frozen cream and like plastic materials, and I accomplish this object by successively placing in a mold or form frozen cream of the proper colors, having given to the surface of the frozen cream in the mold a certain and true configuration, after each successive addition of cream of a different color, by means of templets or plates having the proper profile and a gage to fix the heights of the lines of the surface produced by each templet. A transverse cross-section of a brick of frozen cream thus built up shows the design or ornamentation with sharp and precise lines at all points, and the design will appear in every slice cut from the brick. In practicing this method one or more templets with the profile of the bottom edge shaped according to the requirements of the design are employed, in some cases a series of templets being successively used in working out the design. By means of these templets, which are moved over the surface of the cream from end to end in the molds, the surface of the frozen cream is given a configuration according to the profile of the templet, means being provided to properly gage the depth of the cut of each templet. The surface thus formed has clean-cut parallel lines from end to end of the brick, and as each color of frozen cream which is added to the brick in building it up is given a true surface, according to the pattern, before the next addition of a different color is made the result is that the finished brick, wherever it is transversely cut, shows the same design or ornamentation in sharp lines.

The invention therefore consists of the method of procedure herein described, whereby a brick or form of ice-cream or like plastic material, showing a design in color extending through it from end to end, is produced, and also in the apparatus or tools employed in practicing the same.

Though the invention is specially designed for the production of color-effects in frozen cream, yet it will be understood that it may be employed for the production of similar effects in loaves, bricks, or other forms of food which, whether from being in a comminuted or pasty state, or otherwise, can be molded and shaped—as, for example, deviled meat—and in the following description of the invention and in the claims I wish it to be understood that any article of food which is in its nature plastic and capable of being shaped and molded, and which it may be desired to shape into a loaf, brick, or other form for the purpose of slicing, is the equivalent of the frozen cream specifically mentioned, and comes within the scope of the invention and the claims therefor.

Further, the color effect spoken of in the description of the invention may be due simply to a difference in the texture or grain of two materials forming a brick or loaf. For example, a brick of white ice-cream with a design in white water-ice extending through it would be a product of the invention, the water-ice showing within the cream, though in shade or color it may be very close to the cream.

Figure 2:
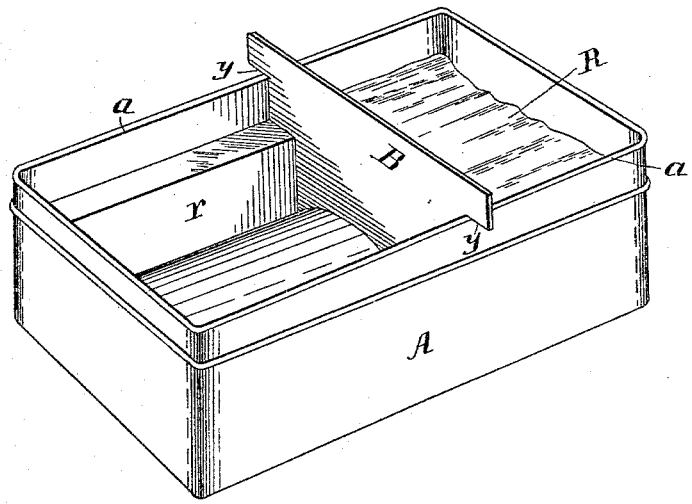
Figure 3:
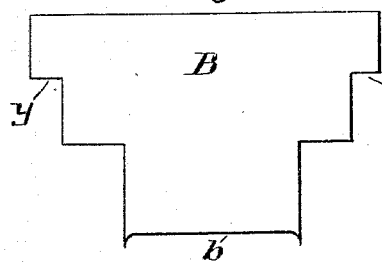
Figure 4:
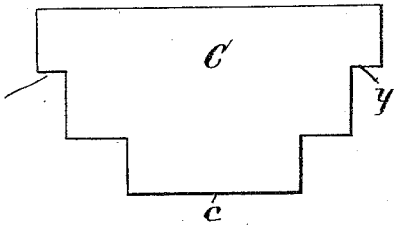

In the accompanying drawings, Figure 1 shows two bricks of ice-cream, for example, one with a heart design, which may be in pink, and the other with the initial letter "D" in any color different from that of the body of the brick, say, in green. In each case the design showing at the end of the brick is supposed to extend longitudinally through it, and it will be observed that the second design illustrates a case which shows one color entirely surrounded by another within the brick. Fig. 2 illustrates one step in the making of a brick of ice-cream with the initial letter D design; and Figs. 3, 4, 5, and 6 show the templets used in making the same. Figs. 7 and 8 show the templets to be employed for making a brick with the heart-core. Fig. 9 shows a templet to be used when the brick is to be composed of parallel layers; and Fig. 10 is a diagrammatic transverse section of a brick, illustrating the successive steps in the formation of the D-brick.

The formation of the D-brick of ice-cream will be described—the letter to be in green and the body of the brick in white, for example. A is an ordinary box-mold, which is first partially filled with the white ice-cream R. Then the first templet B is taken and pushed down at one end of the mold until the shoulders $y\ y$ rest on the edges $a\ a$ of the box. The templets are made of sheet metal, or any suitable material, and each templet has the shoulders $y\ y$ designed to rest on the side edges of the box and form a gage to fix the depth of cut of the templet, the part of the templet-plate above the shoulders forming a handle for convenience in grasping and operating it. These shoulders may be lugs, as shown in Figs. 7, 8, and 9, or may be otherwise formed. The bottom of the templet B has the profile $b$, adapted to form the back outside line of the letter D. This templet is moved along on the side edges of the box from end to end, scooping out the frozen cream in its path and leaving a trough-shaped cavity in the white cream. The side and bottom of the mold are thus left filled, as indicated by $r$, Figs. 2 and 10. This trough is then partially filled with the green frozen cream, and the templet or shaper C is used in the same manner as the templet B, just described. The templet C has a straight bottom edge $c$, of a width equal to the height of the letter D, and it levels off the back bar of the initial letter D, leaving the green cream, indicated by S of Fig. 10, in the bottom of the trough. This trough is now filled with the white frozen cream, and the templet D is then used, the projections $d\ d$ cutting out two narrow troughs and leaving the area $t$, Fig. 10, which forms the inside of the letter D, standing in white. The green frozen cream is now packed into the mold, filling the troughs left by the projections $d\ d$ of the templet D and covering over the center ridge S. Then the templet E is used, its bottom edge $e$ shaping the front edge of the initial letter D, the white cream being exposed on both sides of the letter. The cream thus added is indicated at $u$, Fig. 10. Finally the mold is filled up with the white cream V, Fig. 10, and when the brick is cut or sliced transversely each piece or slice will show the initial letter in the center. Any design or ornamentation, letter or monogram can be thus formed by having shapers or templets adapted to form the successive parts of the design. In making a brick with a heart core the templets shown in Figs. 7 and 8 are used, the templets F first forming in the frozen body-cream a trough of the shape of the bottom part or point $f$ of the heart, which trough is then filled with frozen cream of a different color from the body—pink, for example. Then the templet G is used, its profile $g$ forming the top part of the heart figure, leaving the body-cream on either side. The mold is then filled up to the top with frozen cream of the body color, and the heart figure will appear in clearly-cut lines in every transverse slice cut from the brick.

For making a solid brick in different-colored layers templets H, one of which is illustrated by Fig. 9, are used. If the bottom edge is straight, the layers will be straight, but will show an even thickness all the way through, and precise and dainty effects in stripes can thus be obtained that are not possible by the old methods. If the bottom of the templets are given a wavy profile, as indicated by the dotted line $h$, then serpentine layers of color are formed in the brick.

What I claim is—

1. The method of forming designs in color in forms of ice-cream or like plastic material herein described, which consists in building up the form within a mold by successively adding the plastic material of a different color from that preceding, the surface of the material in the mold prior to each change of color being given a true contour, according to the design, by scraping the surface with a templet and removing the excess of material, substantially as set forth.

2. The method of forming designs in color in forms of ice-cream or like plastic material herein described, which consists in placing in a mold for the form or block, frozen cream of one color, then shaping the surface thereof by means of a templet and removing the excess of material, then placing in the mold frozen cream of another color and again shaping the surface with a templet, and thus building up a form, substantially as described.

3. An apparatus for forming ice-cream forms with a color design therein, consisting of a box mold and a set of templets having a gage to fix the extent of projection into the box, said templets having profiles adapted to successively shape the surface of the cream according to a certain design, by scraping it, substantially as and for the purpose set forth.

4. In an apparatus for forming blocks of ice-cream or like plastic material with designs therein in color, a set of templets for forming a certain design, said templets having profiles adapted to successively shape the surface of the material according to the design, by scraping it, prior to a change in the color of the same, substantially as set forth.

5. In an apparatus for forming blocks of ice-cream or like plastic material with a design therein in color, a set of templets for forming a heart core to the block, the same consisting of one templet having a bottom central projection conforming in outline to the bottom part of a heart, and a second templet having a bottom central recessed profile conforming in outline to the top of a heart, the pair of templets being adapted to be successively used, substantially as herein described and for the purpose set forth.

WILLIAM H. HUNTER.

Witnesses:
JOHN T. LILLARD,
R. E. WILLIAMS, Jr.